US006909357B1

(12) United States Patent
Bandy et al.

(10) Patent No.: US 6,909,357 B1
(45) **Date of Patent: *Jun. 21, 2005**

(54) CODEABLE PROGRAMMABLE RECEIVER AND POINT TO MULTIPOINT MESSAGING SYSTEM

(76) Inventors: Marshall Bandy, 670 Lafayette St., Ringgold, GA (US) 30736; David Milligan, 670 Lafayette St., Ringgold, GA (US) 30736

( * ) Notice: Subject to any disclaimer, the term of this patent is extended or adjusted under 35 U.S.C. 154(b) by 531 days.

This patent is subject to a terminal disclaimer.

(21) Appl. No.: 09/920,177

(22) Filed: Aug. 1, 2001

Related U.S. Application Data

(63) Continuation-in-part of application No. 09/342,411, filed on Jun. 29, 1999.

(60) Provisional application No. 60/096,408, filed on Aug. 13, 1998.

(51) Int. Cl.[7] .......................... H04Q 7/14; H04B 15/00

(52) U.S. Cl. ........................ 340/5.65; 340/7.1; 455/503

(58) Field of Search ................................ 340/7.1, 5.65, 340/539, 22, 7.41, 994; 379/40; 455/186.1, 414.3, 503; 704/276; 709/219

(56) References Cited

U.S. PATENT DOCUMENTS

| | | | | | |
|---|---|---|---|---|---|
| 4,558,181 | A | * | 12/1985 | Blanchard et al. | 379/40 |
| 4,641,343 | A | * | 2/1987 | Holland et al. | 704/276 |
| 4,692,742 | A | * | 9/1987 | Raizen et al. | 340/539.22 |
| 4,713,661 | A | * | 12/1987 | Boone et al. | 340/994 |
| 4,897,862 | A | * | 1/1990 | Nishihara et al. | 379/40 |
| 5,095,532 | A | * | 3/1992 | Mardus | 455/186.1 |
| 5,131,020 | A | * | 7/1992 | Liebesny et al. | 455/414.3 |
| 5,241,305 | A | * | 8/1993 | Fascenda et al. | 340/7.41 |
| 5,303,401 | A | * | 4/1994 | Duckeck et al. | 455/186.1 |
| 6,021,433 | A | * | 2/2000 | Payne et al. | 709/219 |

* cited by examiner

*Primary Examiner*—Edwin C. Holloway, III
(74) *Attorney, Agent, or Firm*—Stephen J. Stark; Miller & Martin PLLC

(57) ABSTRACT

A point to multipoint system includes utilizing the FM 57 kHz Radio Broadcast Data System (RBDS) standard and a novel receiver. A single broadcast source sends messages from multiple senders, in a variety of manners including automatically and semi-automatically, to a plurality or receivers who may select to receive or not to receive particular senders' messages. The receiver may be remotely programmable, and may institute actions upon receipt of predetermined stimuli such as a smoke alarm tone. Various automatic and semiautomatic message initiators could include water level detectors, burglar ar alarms, school bus locators.

21 Claims, 4 Drawing Sheets

POINT TO MULTIPOINT MESSAGING SYSTEM OVERVIEW

CODEABLE PROGRAMMABLE RECEIVER AND POINT TO MULTIPOINT MESSAGING SYSTEM

This application is a continuation-in-part application of pending U.S. patent application Ser. No. 09/342,411 filed Jun. 29, 1999, which claims the benefit of U.S. Provisional Application No. 60/096,408 filed Aug. 13, 1998.

FIELD OF THE INVENTION

The present invention relates to a point to multipoint messaging system preferably utilizing the FM 57 khz Radio Broadcast Data System (RBDS) standard and a novel receiver. In general terms, the present invention utilizes a single broadcast source to send messages from multiple senders, in a variety of manners including automatically and semi-automatically, to a plurality of receivers who may select to receive or not receive particular senders' messages. The receiver may also be remotely programmable, and may institute actions upon receipt of predetermined stimuli such as a smoke alarm tone.

BACKGROUND OF THE INVENTION

Ever since man has congregated in groups, certain individuals have banded together for one reason or another. Today individuals are often participants in numerous groups.

Such groups include a single community, such as a town. Another group could be the members of a particular church. Another example could be all the employees at a particular business. Another group could be all of the customers of a particular grocery store. Another group could be the parents whose children are all in the same school. On a national political level, there are two rather large groups, the Republican Party and the Democratic Party. This is by no means an all inclusive list. Most people are associated with several such groups in their daily course of dealings.

These groups also have leaders and/or members which disseminate or initiate the dissemination of information. In the early days of society's development, such disseminators or initiators would gather members of the group together to promulgate information. This could occur at a regular interval or in times of specific need. A similar need exists in today's groups, however, today's groups are more diverse and dispersed. Disseminators, such as political electees, priests or preachers, store owners, chief executive officers, automated or semi-automated message systems, government, neighbors and even the leadership of the parent teachers association of any given school often find themselves in need of conveying information to members of a particular group. Other people may also require or desire communication with members of specific groups at various times and for many reasons. All of these disseminators need an effective means of scheduling point (disseminator) to multi-point (group) communication.

The current methods of achieving rapid point to multipoint messaging suffers from a variety of shortcomings. For instance, point to multipoint messaging may be achieved utilizing a list serve program over e-mail systems. However, this requires the recipients of messages to have access to their computer to regularly check messages for efficient dissemination of information and each recipient is individually addressed. Most current paging devices simply permit the reception of point to point messaging and are more suitable for private communications. The paging devises that do permit multi point broadcast are not designed to be user programable. Chain telephone calling is slow and labor intensive, while broadcast media such as radio and television provide no method for recipients to filter unwanted messages.

Many types of paging software are known in the art. One paging system utilizes the computer software Basepage(tm). This off-the-shelf program can be utilized by a paging service to allow a user to input information in a standard protocol known as TAP. The information is sent to a processing station where it is transmitted. A specific pager having a specific pre-programmed CAPCODE receives this information. Some receivers, including pagers, have been developed to search FM frequencies for a particular PI code as taught in U.S. Pat. Nos. 5,346,607; 5,345,606 and 5,345,605.

Some paging systems have also been formulated which allow a person having a pager to receive such information as sports scores. These pagers receive this sports information, but the known pagers are not user programmable to select or deselect to receive this information.

Instead, the pager is programmed by the service provider before being delivered to the user to receive this information. These prior art pagers do not allow the user to choose which information is received once a particular pager is selected, without vendor assistance. Furthermore, these pagers do not allow the user to choose to select from or deselect other sources to receive information.

At least one pager company is known to offer a particular pager to be programmed with up to eight CAPCODES. However, this pager must be reprogrammed by the paging company to change any or all of the CAPCODES. These CAPCODES are neither user programmable nor remotely programmable.

A need also exists to provide disaster and emergency alerts to members of a community, groups or to individuals. Such disaster information may include information on tornados, storms, floods, fires, hazardous material, or power outages and the like. These alerts may use sensors and may be automatic. Other information may be particularly important to a given community as well. Information including election day results, location of a bus along a route, traffic conditions or deaths and births in the community may be rapidly disseminated to the members of a community wishing to receive such data. Accordingly, it is a purpose of the present invention to provide a method of facilitating point to multipoint messaging and a novel receiving device utilized in this system.

Another purpose of the present invention is to provide a method of advertising.

Another object of the invention is to utilize an existing subcarrier of an FM radio station.

Another object of the invention is to allow a user to program a receiver to receive messages from selected senders. The consumer can select from many senders from which to receive messages.

Another object is to allow members of a particular group to receive messages at the same time when the message is sent only once by the sender. This can save time and money when attempting to quickly and economically communicate with members of a group. A group leader, initiator or disseminator, can send messages instantly and only once knowing that it is transmitted to every member of the group.

Another purpose of the present invention is to provide communication of a condition to at least one recipient in an automatic or semi-automatic manner.

Another object of the present invention is to allow a receiver to be at least partially programmed from a remote location.

Another object of the present invention is to provide individuals selected regional information including traffic, emergency or other information.

Additional objects and advantages of the invention will be set forth in part in the following description, or may be obvious from the description or accompanying drawings, or may be learned to practice the invention.

SUMMARY OF THE INVENTION

The communication method and system utilized herein is a novel method of point to multi-point communication. To utilize this method and system, information is first sent from a disseminator, or information initiator, to a data receiver. The data receiver may, or may not, convert the format of this information prior to sending the information to a processing station. Information leaving the processing station is converted to an acceptable format to be transmitted via a radio transmitter. A signal generator is typically required to convert information into an acceptable format for transmission by a radio transmitter. The radio transmitter transmits the information, preferably on a subcarrier of an FM (frequency modulated) radio station. The information is coded with a particular identification code, known as a CAPCODE which may be thought of as the relative equivalent of a telephone number. This CAPCODE may be attached at any step prior to transmission of the information. The transmission may also be coded with another type or identification code known as an operator code or with a PI code. Furthermore, the transmission may be coded with additional or alternative identification codes. A programmable receiver receives the information from the radio transmitter provided that the receiver is programmed to receive the particular identification codes in the transmission, i.e., such as a CAPCODE. Once at the receiver, the information is stored and is available to be reviewed by the group member who uses that receiver. This completes the process of disseminating information to a group member.

A key difference between this technology and prior paging technology is the ability to allow a consumer to program a receiver to receive messages from selected senders or information initiators. The consumer may also program the receiver to receive messages with particular identification codes from a sender. Also, many users can receive a single message sent from one information initiators at the same time. A group leader can send a message once, and know that this message has been sent to every member of the group. In a preferred form, the radio transmitter utilizes an existing FM subcarrier. Since many FM subcarriers are unutilized, this communication system may be implemented on existing broadcast infrastructure.

Predetermined messages may be sent in response to alarm conditions or status signals such as the position of a bus along a route. Traffic information may be selectively received applicable only to specific areas, or road segments.

CAPCODES under this system may be assigned to groups as well as individuals. Some CAPCODES may be selected by the consumer; some may be programmed by the vendor on site or by remote connection.

Figure 1:
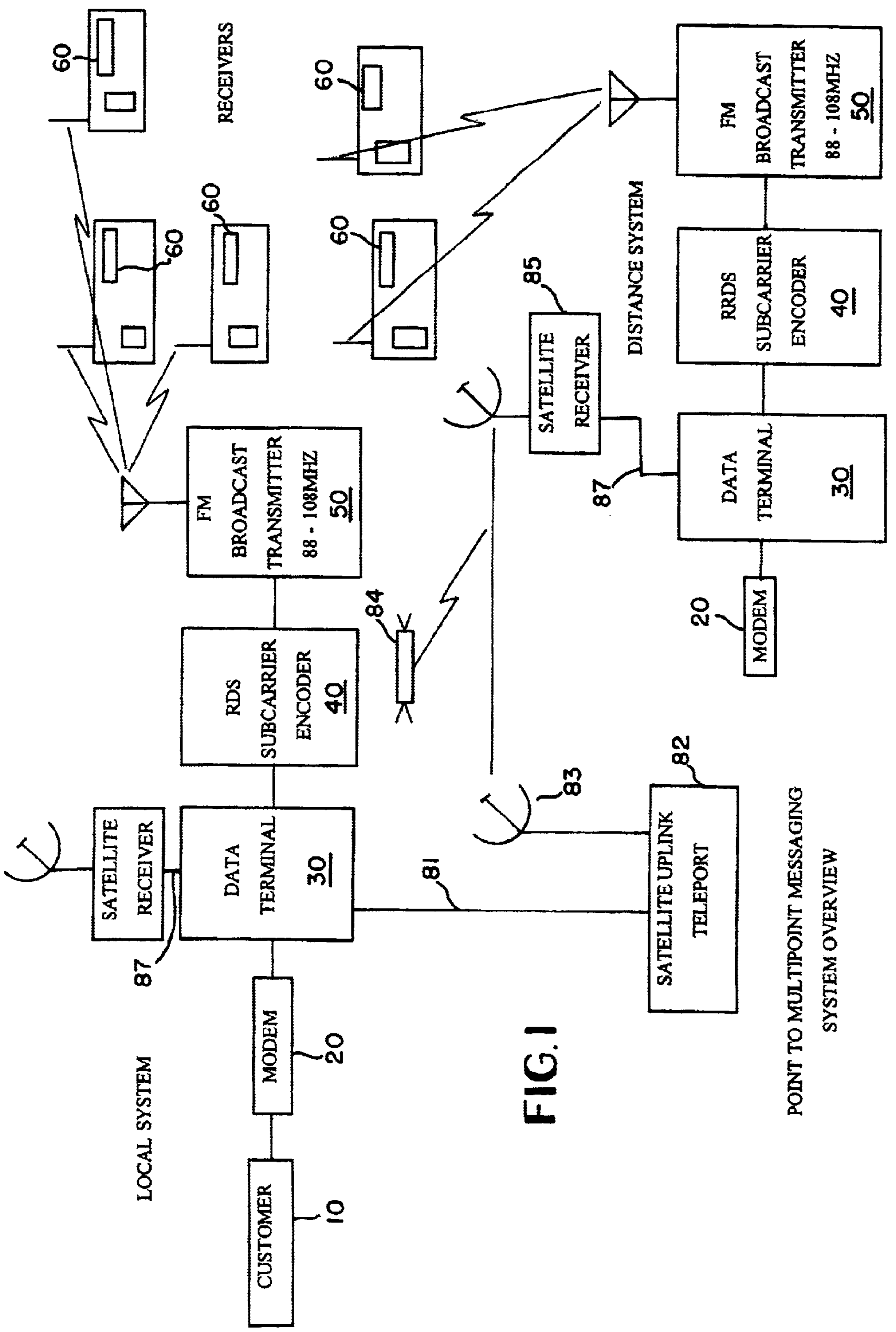
FIG. 1 shows an overview of the operation of the point to multipoint messaging system according to the present invention.

Appendix A is a map showing streets and areas divided into segments for use with reporting traffic to users of the preferred embodiment of the invention.

Repeat use of reference numerals in the present specification represents like, similar or analogous parts, features or elements of the present invention throughout several views.

DETAILED DESCRIPTION OF THE DRAWINGS

The present invention provides a system of point to multi-point communication together with a method of inputting selectable codes denominated CAPCODES or "phone numbers" into an FM radio programmable receiver designed for receiving messages from data broadcast from an FM radio station. With the appropriately designed receiver, this method allows for point to multipoint reception to individuals who elect to receive messages from particular information generators or initiators. The initiators will often be automated or semi-automated systems, business owners, government entities, business managers, civic organizations, and other persons needing to communicate immediately to a plurality of individuals at diverse locations. The present system permits the message recipients to determine the initiators from which they desire to receive messages. The present system also allows for remotely programming a receiver.

FIG. 1 is an overview of an embodiment of the system. The point to multi-point communication begins with a message, typically originating from an information initiator 10, such as a customer, by an e-mail or signal from a data emitter 20, such as a computer or other message generating device, including but not limited to touch-tone telephones. Other information initiators include a variety of automatic devices such as smoke alarm monitors, water level alarms, etc., and computers running programs which search through weather information for location specific data or customer e-mail accounts. Other types of messages may be generated by a combination of moving and detection actions such as bus stop information (as by the bus driver entering a stop number into a transmitter which triggers a message indicating the bus' location on the route).

The initiator 10 often employs a data emitter to send messages over a standard telephone network to a processing station 30 that receives the message and translates the message into an acceptable format for radio transmission. The processing station 30, shown as a data terminal, receives the message and sends it to a signal generator 40, the RBDS subcarrier encoder. From the signal generator 40, the message goes to the radio transmitter, shown as FM Broadcast Transmitter (88–108 Mhz) 50.

In a preferred embodiment, the signal generator 40 utilizes an SC100(™) developed by CRL System of Tempe, Ariz. and manufactured by Cirkisys Technology, Ltd., for formatting messages for input into a data stream in an RBDS 57 khz subcarrier generator of an FM radio station. The FM station transmitter system receives the 57 khz signal and carries it within its broadcast on a subcarrier to its broadcast area as it transmits its primary signal. An RBDS receiver, such as the modified FM radio receiver illustrated in FIGS. 1, 2 and 4, then receives the RBDS data and divides the signal into the RBDS standard packets. The receiver is a user-programmable receiver 60. If a message is transmitted having a particular CAPCODE, or "phone number" which has been programmed into the receiver, the receiver filters and stores this message for immediate display, or recall by a user. Of course, the data need not be sent according to the RBDS standard. The RDS standard is a somewhat different standard utilized in Europe, and other data formats may also be utilized. Furthermore, the receiver 60 may also be programmed by the user, may be pre-programmed with certain CAPCODES or "phone numbers," and may be remotely programmable. CAPCODES corresponding to "phone numbers" of the user have been found to be particularly convenient, however other numbers could also be utilized as CAPCODES.

An alternative embodiment, also illustrated in FIG. 1, shows conductor 81 linking the processing station 30 to a satellite uplink 82. The satellite uplink 82 sends information to a satellite uplink transmitter 83 which transmits information to satellite 84. From the satellite 84, information is transmitted back to a remote system via a satellite receiver 85. From the satellite receiver 85, the information is conducted through down link conductor 87 to a second processing station 30. Instead of utilizing a satellite uplink/downlink system, other network systems could be utilized by including telephone lines, the internet, or others.

Figure 2:
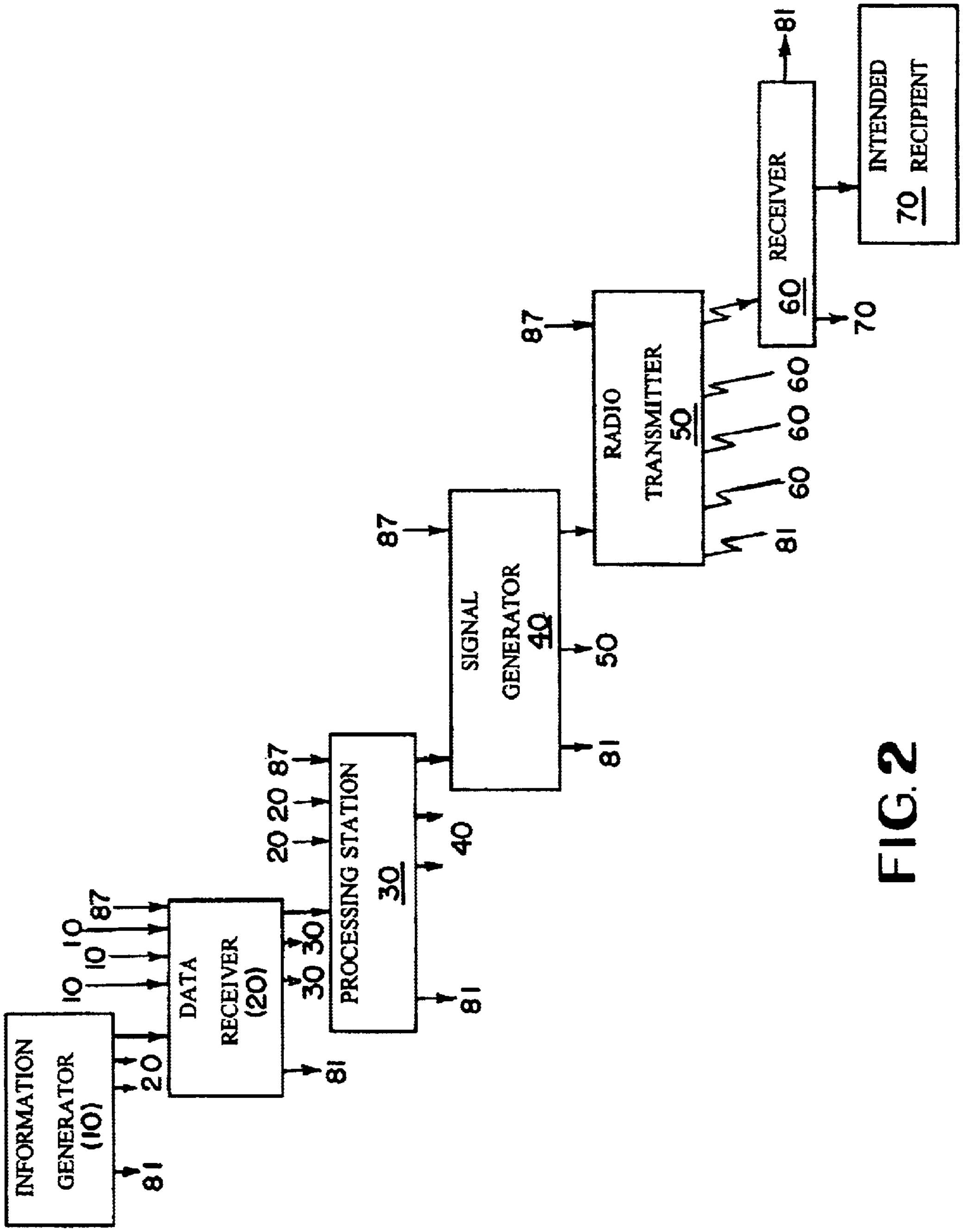
FIG. 2 is a schematic of local operation of the system of FIG. 1 in more detail.

Turning to FIG. 2, a message will typically originate from an initiator 10. An initiator 10 could be an individual desiring to communicate with multiple locations, an automatic device producing an information stream, (such as an automatic fire alarm, or alarm monitor, sending a signal intended to be received by emergency personnel, neighbors or others, or a polling device detecting the presence of e-mail, or retrieving updated weather information).

A number of automated, or semi-automated, initiators 10 have been developed. One initiator 10 is an alarm monitor. The alarm monitor may utilize a voice recognition chip which is programmed to respond to a particular alarm signal such as a home smoke alarm tone.

Several different sounds may be recorded in the alarm monitor. The voice recognition chip receives ambient sound through a microphone. The ambient sound is sent through a comparator which compares the sound to the stored sounds (such as the smoke alarm sound). When the ambient sound corresponds with the stored sound, a trigger condition is activated. In the preferred embodiment for a smoke alarm monitor, three successive triggers within a thirty second period initiates the alarm monitor output. This has been found to reduce false alarms while providing adequate warning. Once an alarm output is generated, the monitor will reset after a delay. An alarm monitor output results in the initiation of a transmission by a data emitter 20.

Other alarm monitors may utilize technology other than, or in addition to, voice recognition technology. Other alarm monitors may include frequency bandpass filters, signal level monitors or other monitoring technique. These technologies may be adapted to provide a satisfactory alarm monitor.

The Dynamo Dresden Company of San Antonio, Tex., has developed an automatic dialer for use with pagers called PageOut(™), that may be advantageously used as an emitter. As sold, this device dials a phone number corresponding to the customer's pager number when a caller leaves a message on the customer's telephone answering machine. This enables the customer to be alerted to check his phone messages or be alerted to other conditions. For instance, for a message sent to an answering machine, a 2 would appear on the display of the customer's pager. If an alarm or home security system is tripped, a 3 would appear. Other numbers can be assigned to other conditions.

The operation of the Page Out(™) system is easily altered so that when an alarm monitor output is received or an output from a home security system is received, the PageOut (™) emitter dials a specific telephone number which corresponds to a specific alarm condition for the customer stored at the processing station 30, instead of dialing a pager number. By using caller ID to recognize the emitter, by having the emitter 20 send information to the processing station, or both, the processing station 30 may retrieve a predetermined message corresponding to the event and customer. Different types of events may be assigned different telephone numbers at the processing station to aid and retrieve a lot of the appropriate predetermined messages. Accordingly, the neighbors and emergency personnel that have selected the appropriate CAPCODE or "phone numbers" for the customer's alarm message may be able to respond quickly to an emergency condition. If a single number is called to report multiple emergency conditions, the data provided by the emitter may vary based upon the emergency condition (i.e., fire, power outage, etc.). Other initiator sources such as burglar alarms, panic buttons, etc., could provide inputs to the emitter for transmission to the processing station 30 and broadcast of a predetermined message.

A second type of automated initiator 10 is a water level detector. In areas where flooding is a problem, a water level sensor may be calibrated to certain alarm level positions. Upon water reaching each particular alarm level, a telephone number may be called by the circuitry in a similar manner as done for the smoke alarm condition. The telephone number dialed may be different for water level than for fire alarms or the processing station may utilize caller ID to determine the call is from a water level detector. A predetermined message is broadcast with a CAPCODE or "phone number" and that message will be received by the appropriate emergency personnel and the individuals located in that particular floor area who have programmed their receivers with the appropriate CAPCODE or "phone number." Additionally, the messages sent by the emitters 20 may differ. Different numbers may be called or different predetermined messages used based on different water levels such that the individuals may be alerted as to rising water levels over a period of time.

Semi-automated initiators 10 may also be utilized. For instance, school buses typically travel over a certain route. A plurality of stops are made by the school bus and the school bus then proceeds to a school. By assigning each stop a number, a bus may be equipped with an initiator 10 in the form of a counter and a broadcast emitter 20. When the bus gets to the first stop, the bus driver selects one on the counter and presses send on the emitter 20. A message is then transmitted to the data processor 30 by the emitter 20. When the school bus reaches the second stop, the counter is changed to 2 and the send button of the emitter 20 is pressed again. Upon receipt of each message, the data processor generates the corresponding message and has it broadcast with the CAPCODE or "phone number" corresponding to the particular bus. In this manner, each time the school bus gets to another stop, a message may be sent which may be received by the interested individuals in the FM radio broadcast area. Typically it will only be families along the school bus route who enter the bus' CAPCODE or "phone number" so that the parents will know when to send their children out to a school bus stop. Selected numbers may also be utilized for other predetermined messages, i.e., 99 to request a tow truck. Since the processing station 30 records indicate the last stop the bus reported, the emergency personnel could be directed to the bus' approximate location. Messages could include "call an ambulance," "I have been in an accident, but no one was hurt," or any other message.

Another semi-automatic type of initiator 10 is a weather information retriever. The retriever filters through a continuous stream of weather information for area or location specific information. When the forecast, weather, or other regional or area specific information is located, the information is downloaded by the initiator 10 and sent by emitter 20 to processing station 30. No human intervention is necessary. Other types of data may be processed similarly.

The initiator 10 submits information, perhaps in the form of a message or other signal to at least one emitter 20. The emitter 20 may be a personal computer having a modem, or the emitter could be any of many other message origination devices, including but not limited to, a touch tone telephone. The initiator 10 sends its message through the emitter 20 to at least one processing station 30. In a preferred embodiment for individuals serving as initiators 10, the emitter 20 is a computer equipped with Basepage(tm) software which is a common paging software. This software allows a user to input a message. The message is assigned a CAPCODE or "phone number" based upon the individual or group to which the message is directed. In the paging industry, the telephone number of the recipient's pager will often at least partially correspond to the CAPCODE or "phone number" which is entered. In the present messaging system, an information code, or identification code, is assigned to the initiator's message which corresponds either to a particular initiator or to a particular group. A portion of a telephone number for a person or group may also be utilized as the CAPCODE for this system, which is preferred.

The Basepage(tm) software converts message information into TNPP protocol form TAP, or other protocols. This information is then sent via internet connection to the processing station 30. This system contemplates multiple initiators 10 and emitters 20. Depending on the particular configuration of the system utilized, there may also be multiple processing stations 30, multiple signal generators 40, and multiple radio transmitters 50 utilized. The effectiveness of the system increases in direct proportion to the percentage of households having user-programmable receivers 60.

The emitter 20 need not necessarily convert data into a specific protocol. Instead, the emitter 20 may act simply as a conduit from the initiator 10 to the processing station 30. If the emitter 20 does not assign an identification code to the information from the initiator, then the processing station 30 must assign this code. Caller ID systems at the processing station 30 may assist in assigning CAPCODES for dialed in messages. Login procedures may also be utilized to recognize the initiator when data is input via the internet.

The processing station 30 may also be utilized to program at least some CAPCODES into a particular receiver 60. Receivers 60 may be configured such that if a particular message is received then a processor within the receiver 60 checks to determine if the message includes a serial number or other command identification number associated with that particular receiver 60. If the serial number of that particular receiver is a portion of the message, then the processor will perform the command portion of the message. The command message may include reformatting all of the CAPCODES in a particular receiver 60, selectively adding or deleting particular CAPCODES, or troubleshooting the receiver 60. It is anticipated that some CAPCODES may be sent in hexadecimal notation. Since the keypad of the preferred embodiment receiver 60 includes digits 0 through 9, star, and number symbol, and letters A through D, it can be seen that many hexadecimal representations will not be able to be entered by the consumer. Of course, the number and pound key could be utilized with symbols A through D and digits 0 through 9 to enter hexadecimal representations if configured through C hexadecimal notation. It is anticipated that the processing station 30 will generate the appropriate message to be sent to a particular receiver 60 such that hexadecimal CAPCODES are received and entered in a particular receiver.

If hexadecimal digits are utilized, over four billion combinations may be created from just eight hexadecimal digits. Of course, the version numbers of the software could be changed allowing serial number duplication and three trillion possible combinations. The use of command instructions directed to a particular receiver 60 allows trouble shooting of receivers, resetting receivers remotely, or adjusting the CAPCODES received by a particular receiver 60. The use of hexadecimal CAPCODES may also allow for messages to be sent to certain groups or individuals without the ability of others to monitor that CAPCODE, since in a preferred embodiment hexadecimal notation CAPCODES cannot be entered by the user.

One possible use for a non-user programmable CAPCODE is to notify a particular individual of new e-mail received via the internet. These e-mail notifications are not receivable by others, since the other people lack the ability to program these particular CAPCODES into their receivers. In order to begin the process of supplying e-mail notification to a particular user, the user will need to provide at least their e-mail address, and possibly a password to the processing station 30. A semi-automatic information generator is adapted to periodically scroll through that user's e-mail account to look for new messages.

Notification of new e-mail is one possible use of non-user programmable CAPCODES. Since others cannot enter the particular CAPCODE, they will not be able to use their receiver to access e-mail notifications to others. E-mail notification typically involves the customer supplying their e-mail address and password. A semi-automatic information generator periodically scrolls looking for new messages. This process is somewhat similarly to the process of searching for new weather information.

In a preferred embodiment the processing station 30 is a part of the signal generator 40. This processing station 30 may, or may not, translate the messages received from the data transmitter 20 from one format to another. From the processing station 30 the message will be sent to and processed by a signal generator 40 which formats the message for input into a data stream suitable for transmission by radio transmitter 50. The processing station 30 may, or may not, be a part of the same device which has the signal generator 40. In a presently preferred embodiment, the signal generator 40 is the SC100. This particular signal generator 40 incorporates the processing station 30 which receives information from data transmitter 20. In a most preferred embodiment, the data stream will be in a RBDS format and broadcast on a 57 khz subcarrier generator of an FM radio station. The SC 100 receives TNPP protocol information and converts it to 57 khz subcarrier in RBDS protocol. If a format other than FM radio broadcast is utilized, other signal generator types may be necessary. Additionally other signal generators 40 may be utilized with FM radio transmission.

From the signal generator 40, the message will be conducted to the radio transmitter 50 for broadcast. Typically a radio station broadcasts via microwave link to a radio tower where RBDS information is broadcast by subcarrier. Receivers adapted to receive these types of messages receive the broadcast information. The signal is digital in nature and not audible on many traditional radio receivers. Additionally, the radio transmitter 50 need not be an FM radio transmitter. Other frequencies including standard, or non standard, AM, shortwave or other frequencies could be transmitted by the radio transmitter 50.

The signal generator 40 is commonly installed at the transmitter broadcast studio of a radio station. Although the RBDS standard is utilized in the United States, other standards are suitable, including the EPP standard (European Paging Protocol standard) and the RDS standard.

The RBDS standard utilizes identification numbers in the form of PI (program identification) code. The PI code is a hexadecimal representation. Many radio stations utilize a PI code to identify the call letters of a particular radio station. For instance, the radio station WABC could have the hexadecimal representation of 54C4. Under the EPP standard, Group 13(a) identifies the operator code of the receiver (system) or local radio station. At least three national networks utilize the EPP standard and have Group 13(a) operator codes. The communication system described herein is completely adaptable to the EPP standard, however, for ease of explanation, the system utilizing the RBDS standard will be discussed.

The RBDS standard is described in detail on the RDS organization website at http://www.rds.org.uk/rds98/rds98.htm. The RBDS standard utilizes 16 groups of information, referred to as groups 0 to 15.

The audio standard Group 7 data is monitored by the paging industry. Group 0 is typically only the PI code. Other groups may include a PI code as well as other information. Of the 16 groups in the RBDS standard, only Groups 0, 1, 2 and 7 are monitored by a significant number of receivers. Depending on particular software configuration, any of the 16 RBDS groups may be utilized to convey information and information codes. For any particular PI code, approximately 10,000,000 different CAPCODES can be generated. If the PI code is changed and a receiver is made PI programmable, billions of CAPCODE/PI code combinations could be utilized.

Some radio receivers are adapted to search PI codes or operator codes transmitted by radio stations. Furthermore, some radio receivers display the PI code when it begins with a W or a K. In use, these radio receivers display the call letters of the radio station. In the United States, the Federal Communications Commission (FCC) currently requires call letters of a radio station to begin with a W or with a K. To avoid conflicts with call letters, the present system of communication preferably utilizes radio receivers adapted search for particular operator codes, however the use of receivers adapted to search PI codes is an acceptable alternative.

In present operation, the signal generator 40, generates a 57 khz signal in the RBDS format that is placed on a subcarrier of a radio station. The signal has an operator code of 2. As the signal of the radio station is amplified, the subcarrier signal is also amplified and transmitted to a listening area.

In the United States, the FM broadcast range is from about 88 Mhz to about 108 Mhz. The FCC assigns a particular broadcast band for each radio station. The center of this band is typically the primary carrier of that radio station. In order to transmit over the audible range, a transmitter typically fluctuates from the primary carrier on the order of plus or minus 75 khz for the audible range. Accordingly, within the band prescribed by the FCC, there are a number of subcarriers which could be utilized by that radio station, especially for non-audibly transmitted information.

The receivers 60 and communication method of the present system are preferably adapted to search for a particular operator code, without necessitating the specification of a particular frequency. Most commercially available radio receivers are designed to be set by their users to a particular frequency in order to receive the broadcast of a particular radio station. The receivers 60 of the present system and method may, or may not, be preset to a specific frequency. In a preferred embodiment, an operator code such as 2 is transmitted on the frequency on the subcarrier of a particular radio station. A receiver 60 searches for a particular operator code and upon identifying the desired operator code, such as 2, the receiver remains tuned to the frequency of that station. After locating an appropriate operator code frequency, the information from predetermined RBDS groups can then be received and processed.

Figure 3:
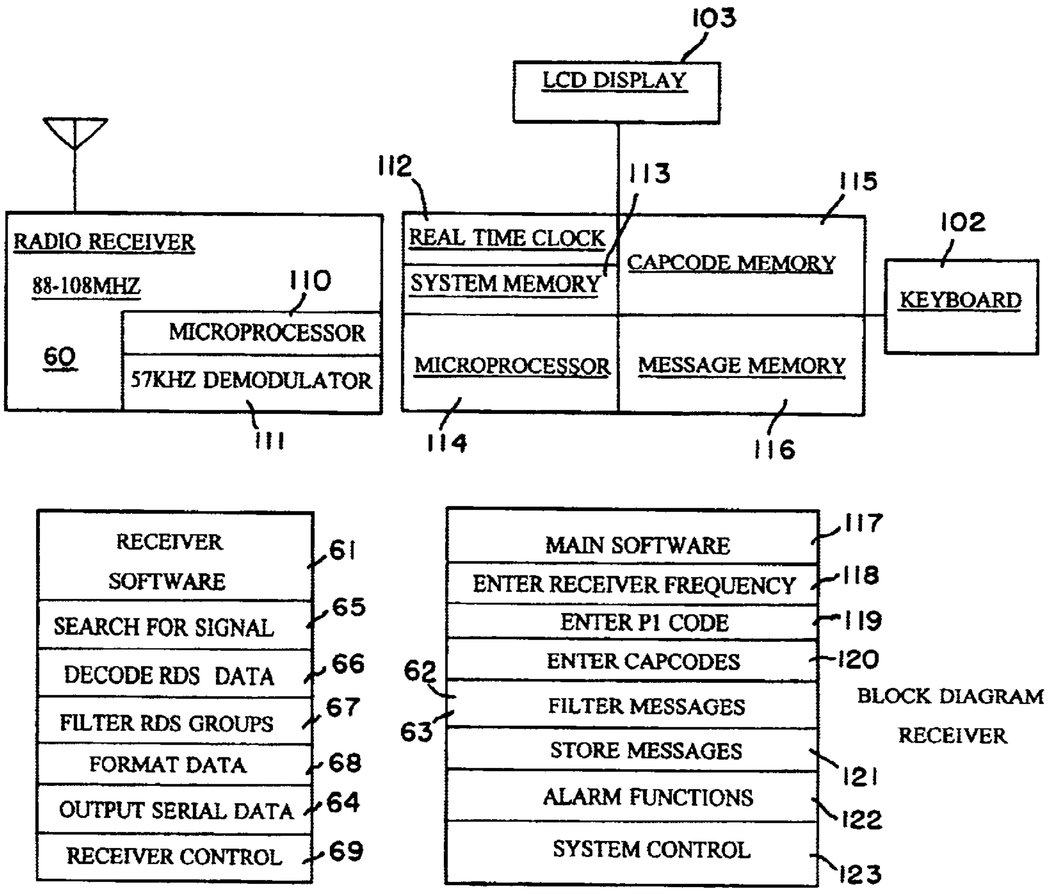
FIG. 3 provides a systematic representation of a receiver utilized with the preferred system.

The users of the receivers shown in FIG. 3 are able to enter the CAPCODE assigned to the initiators 10 whose messages they wish to receive. The receiver 60 sorts and decodes from broadcast having the correct operator code. Messages are filtered according to whether the CAPCODE information corresponds to any of the user-programmed CAPCODES or any pre-programmed CAPCODES in the receiver 60. Programming CAPCODES may be performed by utilizing the keypad incorporated within a receiver. Alternatively, CAPCODES may be programmed utilizing touch screen or serial interface such as an RS232 port on a personal computer. The receiver may then display the decoded messages on an LCD screen, or in commercial applications on billboards or road signs, or any other device designed to display electronic messages. The receiver may even be configured to broadcast the messages audibly by text-to-voice conversion. FIG. 3 illustrates the inner workings of a user-programmable receiver 60. The particular receiver 60 shown is a typical FM receiver of the type adapted to receive radio broadcasts between 88 and 108 Mhz. The receiver 60 has a microprocessor 110 and a 57 Khz demodulator 111. As information is received by the radio receiver 60 the demodulator 111 and microprocessor 110 work together to demodulate the information received by the receiver 60.

Receiver software 61 has a receiver control module 69, effectively a receiver operating system. Other software modules include search for signal 65, decode RBDS data 66, filter RBDS data 67, format RBDS data 68 and output data 64. Using these modules the receiver 60 provides messages to the user as they are processed. After receiving information from the radio receiver 60, the serial output is directed to the system microprocessor 114. The system microprocessor 114 operates in conjunction with the system software 117 which has a system control module 123, effectively an operating code for the other modules.

These modules may allow a user to enter a receiver frequency 118 or in the absence of an entered frequency, the software 61 can allow the receiver to search for a frequency 65. Another software module allows for the entry of a PI code 119. The PI code 119 may be user programmable or may be preselected or programmed by the respective vendor. In the presently contemplated system, an operator code is utilized instead of a PI code. Apart from the receiver being adapted to check for matching operator codes rather than a matching PI code, there is no significant change in the operation of the invention.

Another module provides the ability to enter CAPCODES 120. Again, CAPCODES may be user programmed or may be programmed or preprogrammed by the vendor. Based upon the selection of the CAPCODES and the PI code, the system software 117 provides instructions to the receiver software 61 to filter messages 62, 63 according to the PI code and CAPCODE. The system software also has a module to store the messages 121 having PI codes and CAPCODES matching the programmed criteria. Some messages may trigger alarm functions 122 or actions such as turning on a light bulb. Other system control 123 features may also be utilized. The receiver system is advantageous configured a real time clock 112 including alarm functions, a system memory 113, CAPCODE memory 115 and message memory 116, an LCD display 103 and a keyboard 102.

It is anticipated that FM radio receivers provided with additional enhancements will be popular instruments for receiving RBDS broadcasts. In this fashion, FM radio receiver owners may enjoy regular commercial radio broadcasts, and simultaneously monitor messages from selected initiators. The enhanced radio receiver 60 is equipped to search for and receive the 57 khz RBDS data 65, to decode the RBDS data 66, to filter any messages not belonging to the precoded data from those selected messages 67, and to output that data 68 for storage 121 and display 103 on the receiver. While it is contemplated that a visual display will be preferred, text to voice software may be utilized to cause the message to be played over the radio speakers. Even when the radio is turned off for the usual commercial FM broadcasts, the receiver may remain activated for the purpose of receiving RBDS data and filtering and storing the selected messages. The receiver 60 may utilize also have a message indicator to alert the receiver owner of receipt of an unread message.

A user-programmable receiver in the preferred embodiment has a keyboard 102 in the form of a numeric keypad as well as a liquid crystal display (LCD) 103. Furthermore, the preferred receiver comprises an FM entertainment radio 130 having a tuner control 107, a speaker 131, a volume control 106, and an antenna 108 as a part of a composite unit. The keyboard 102 may be utilized to enter information codes, such as PI codes and/or CAPCODES, for selectively choosing the groups whose messages will be captured by the receiver 60. The receiver 60 has message memory to store a number of selected messages. The message memory may be advantageously divided to permit storage of both user selected messages and several demand selections available to all receivers. The demand messages correspond at least in part to CAPCODES pre-programmed, possibly for local news, local weather, etc. These demand messages may have sponsors where the message is displayed in conjunction with advertising. If ten categories of demand messages are chosen, each category of demand messages can be accessed and displayed on display 103 by pushing number 0–9 on the keypad. Furthermore, a group of stored demand messages may continuously scroll across display 103 together with sponsor advertisements when a user is not actively utilizing the display 103 of the receiver 60. These scrolling messages can also be updated through the processing station 30. Furthermore, the time and date can also be displayed in the presently preferred embodiment. The memory storage device 116 of a presently preferred embodiment is 8 Kb of RAM access memory and uses a first in, last out storage mechanism such that upon receipt of the first 85 messages, the first message in is discarded. The 8 Kb of RAM will also hold 21 pages of messages for each of ten demand selections. Other and additional storage mechanisms could be employed utilizing different storage techniques.

An enhanced keyboard 102 may also be used to sort through messages, and specific keyboard functions may be utilized to display certain information. For instance, the "A" button 132 displays messages, the "B" button 133 displays a menu which allows the user to enter a zip code, tune the radio, select a community, enter a phone number, or CAPCODE etc., the "C" button 134 returns to previous screen and the "D" button 135 turns the radio on or off. The keys 0–9, when pressed alone, are utilized to display demand message information such as the local weather forecast possibly with a sponsor's advertisement. The keypad utilized may be a standard numeric keypad having a 4×4 key arrangement like a touch tone telephone. Other data entry mechanisms such as a conventional typewriter keyboard, mouse, light pen, touch screen, or serial interface could be utilized as well. A keyboard may also support alphanumeric entry of data. CAPCODES may be associated with text such as CITY HALL or other indicators 10 to notify the user of the receiver 60 of the message origin. The receiver 60 can be as simple, or as sophisticated as desired. The receiver 60 may have text to speech conversion capability, video capability, alphanumeric capability, alarm light 104, and other features. The alarm light may be on when no signal is received by the receiver 60. The light 104 may flicker when a poor quality signal is received. The visual display area may be as simple, or as complicated, as is desired for a particular application. The LCD display 103 utilized in the illustrated embodiment supports eighty characters. This is satisfactory to display many simple messages. Messages may be displayed as a series of linked pages so that a message may contain many more than eighty characters. With a sophisticated receiver, it is possible to receive broadcast image signals and sound (or text to speech) which may be displayed on a screen and heard through a speaker.

When using a numeric keypad 102, such as a touch tone telephone keypad, the ten numbers 0–9 may be utilized, as discussed above, to identify a specific item of information such as news, weather, sports, entertainment, or obituaries. Additional demand messages may be stored with the use of multiple numbers. These items of information may be displayed when the corresponding numbered key or keys are pressed. As a commercial tool, the specific message may be sponsored by a particular business and/or organization. For instance, the message may read: "Today's weather is a hot, sunny day with a high of 80 degrees. This weather forecast is brought to you by the XYZ Company."

Receivers 60 may be configured to receive more than one message at a time by utilizing multiple surfer signals 55, the RDBS data 66, and filter RBDS group 67 modules and the receiver 60. The processing station 30 can be configured such that more than one message is sent to the signal generator to be transmitted at a single point in time by transmitting on more than one frequency or otherwise. Furthermore, certain CAPCODES may correspond to a certain type of group. For instance, CAPCODES having a second digit of zero may be reserved for emergency warning codes.

Other receiver types also include telephones, clocks, televisions, computers or other electrical device equipped with appropriate receiver functions. A receiver 60 may be programmed to trigger a sound such as an alarm 104 or even perform a function, or action upon the receipt of a particular message with a system control 123. One such function is the turning on of a traditional radio to receive a radio transmission from an Emergency Warning System. Another function may be to turn on an appliance, such as a light bulb 100, utilizing conduit 101. For instance, utilizing a control device via an RS232 interface, the receiver may control devices such as controlling water heaters, security codes, burglar alarms, lights, heaters, door lights, etc. Additionally, a receiver 60 may be programmed for a particular CAPCODE or CAPCODES to activate an alarm when a message is received having that particular CAPCODE.

Turning again to FIG. 1, it will be understood that the customer, or initiator 10 must first acquire appropriate software or utilize software operating over a wide area or global computer network, or to otherwise establish an account with a local system. The initiator is assigned a CAPCODE and information is programmed into the local system about the territory in which the initiator's messages are to broadcast. For instance, if the initiator 10 is a local school system, messages concerning school closings need only be broadcast in that school district. On the other hand if the initiator is a national political party, it may wish to broadcast messages statewide or nationally in connection with state or national political campaigns. In the case of such large area broadcasting, the local system may communicate by leased telephone line to a satellite uplink 82 and transmit the message to distant systems equipped with satellite receivers 85 that can retransmit the message. Although it is anticipated that electronic mail or data entry over an internet website are the most convenient methods for a customer to transmit a message to be broadcast to its local system, it may also be possible to utilize a telephone with touch keypad or voice-to-text features, or even to have operator assistance available for the processing station. Furthermore, processing stations 30 may generate automated messages based on the phone number dialed and caller ID or other identification method.

The software required operating at the local system may consist of an administrative module to handle record keeping and billing matters and an encoding module to translate the message to be broadcast into data packets.

Figure 4:
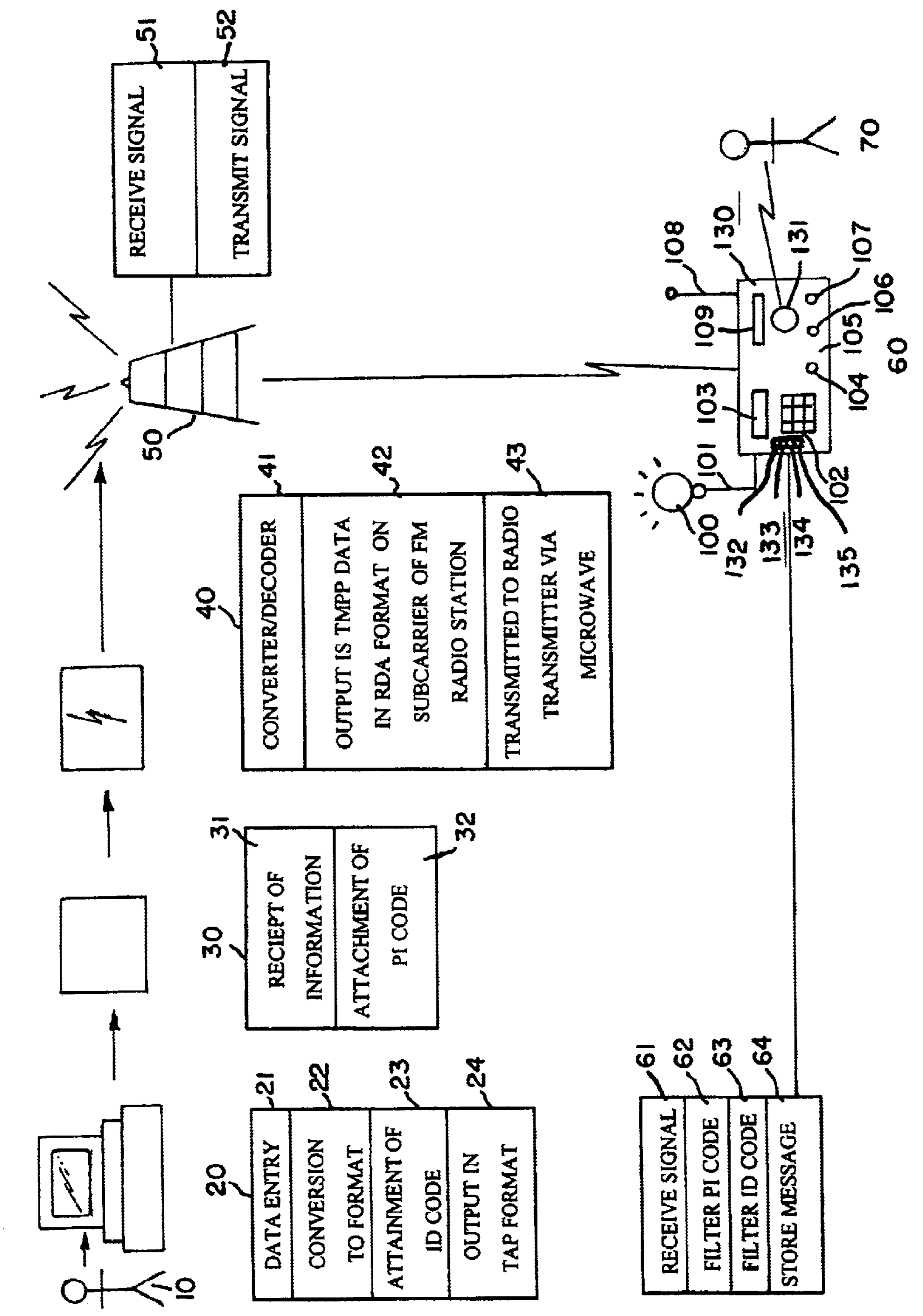
FIG. 4 is a schematic of the system of FIG. 2 illustrating the presently preferred embodiment of the invention.

FIG. 4 shows the presently preferred embodiment of the system. An initiator 10 formulates a message which is sent to a data transmitter 20. The data transmitter 20 allows for data entry 21. The entered data is converted to a format 22 which will be acceptable to a processing station 30. Additionally, the data transmitter 20 attaches an ID code 23. This ID code is the CAPCODE or customer code identifying a particular sender or a group. The information is output to the processing station 30 in TAP or TNPP, or other format 24. As the information arrives at the processing station 30, the information is received 31. A PI code, later used by the receiver to filter out information, is attached at the processing center. Next, the message is sent to the signal generator 40 which acts as a converter/encoder 41. The output is TNPP data in RBDS format on a subcarrier of an FM radio station 42. The information is sent via microwave 43 from the signal generator 40 to a radio transmitter. The signal arriving at the radio transmitter is received 51 and transmitted 52. A receiver 60 receives the message. The illustrated receiver 60 has a conventional radio 110, an antenna 108, a frequency display 109, a speaker 111, a tuner 107, a volume control adjustment 106, a housing 105, an alarm indicator 104, a keypad 102, and a display 103. The receiver receives a signal 61, filters the PI code 62, filters the identification code, or CAPCODE 63 and, if from a selected group, stores the message 64.

Multipoint messaging is very practical and economical using the same improved method. Not only does this method permit a single sender to achieve multipoint message distribution but it also permits a single recipient to receive messages from multiple senders or initiators. The public may be provided access to many CAPCODES for selection and input into their receivers, and receiver owners may determine the initiators whose messages they wish to receive. An additional benefit of the method permits national, regional, statewide, county, and community emergency notification. If an RBDS receiver is placed in a television for screen display of messages, for instance, pinpoint emergency weather notification information may be distributed. By easily bringing messaging to the community level, it is possible to realize economical, targeted multipoint messaging.

One specific example of useful information which may be disseminated is traffic information. A map of Southeast Tennessee and Northwest Georgia is included in Appendix A. A plurality of symbols or numbers are associated with various regions and roads. A table in Appendix A shows the coverage areas of the representations on the map and provides the CAPCODES to the consumer which correspond to particular regions and roads. Traffic reporters may be provided with an input device to submit traffic information i.e., wrecks, slow traffic, etc., by region and road to the processing station 30 or to the signal generators. The consumer, having selected particular roads and regions based on an expected commute is then provided with the desired information. The areas of coverage selected by CAPCODE may also be utilized to promulgate messages regarding power outages, tornado warnings, etc.

Enormous commercial and advertising possibilities may be realized through the present communication system. Fees may be charged for the assignment of CAPCODES to groups and/or senders of information. Sponsorship for categories of information such as weather, news, sports, etc., especially those categories stored for on demand display, may be sold. Furthermore, advertisements may be sent to units to be displayed when a user is not actively seeking to locate a specific message. Radio stations are provided a commercial use for at least one of their side bands which are now not utilized.

Currently the RBDS data transmission rate of 9600 Baud has been achieved. At this rate, the communications system decoded herein may deliver approximately 15,000 messages per hour, believed to be equivalent to all the non-personalized mail typically sent to the residents of a town of about 10,000 people. This is achieved utilizing just one operator code and up to 10,000,000 CAPCODES. It is also possible that more than one operator code may be utilized by various receivers. This permits the assignment of CAPCODES and operator codes unique to billions of groups and/or individuals. Furthermore, multiple subcarriers could be utilized. At a rate of approximately 1200 Baud, approximately 20,000 messages are capable of being sent between the hours of 8:00 a.m. and 6:00 p.m. When a message is sent, it is expected that the message will be broadcast in a relatively short amount of time. On the other hand, some initiators using the system may not care when during the next few hours, or even days, that the message is sent. Accordingly, different fees may be charged for different message priorities.

Initiators 10 may be charged for sending a particular message. Customers of receivers 60 may be charged a monthly fee for renting a CAPCODE (similar to a fee charged for having a telephone number). CAPCODES may be assigned to the police authorities and local government agencies that provide emergency data. A subscription service may allow private CAPCODES, possibly hexadecimal numbers inaccessible by a receiver owner, to be used to notify a subscriber of new e-mail messages. The subscriber merely provides their e-mail addresses and passwords to the processing station which polls the e-mail accounts and sends a message to the subscriber's CAPCODE upon detection of a new message. The message broadcast may include a portion of the e-mail text.

Businesses may buy user-programmable receivers with the businesses' CAPCODE permanently entered. Accordingly, the user of that receiver would receive all messages sent out having that particular businesses'CAPCODE (i.e., a particular receiver would get all the advertisements from the XYZ Corp. if XYZ Corp.'s corresponding CAPCODE was permanently entered).

While preferred embodiments of the invention have been described above, it is to be understood that any and all equivalent realizations of the present invention are included within the scope and spirit thereof. Thus, the embodiments depicted are presented by way of example only and are not intended as limitations upon the present invention. While particular embodiments of the invention have been described and shown, it will be understood by those skilled in the art that the present invention is not limited thereto since many modifications can be made. Therefore, it is contemplated that any and all such embodiments are included in the present invention as may fall within the scope or equivalent scope of the appended claims.

Glossary

CAPCODE—An alphanumeric representation in a paging protocol having a similar purpose as a telephone number in a telephone system (i.e., to allow for the sending and receipt of messages to specific receivers).

EPP—European Protocol—a data transmission standard utilized in some European countries.

OPERATOR CODE—A code assigned in the RBDS standard in the U.S. which is currently not utilized. Can be any number between 0–9 or A–F.

PI CODE—Program Identification Code—Traditionally PI codes in the United States are based on the call letters of the broadcasting radio station. PI Codes are sent as four alphanumeric digits which may be recognized by receivers as the PI code. Specifically adapted receivers may search PI codes for specific codes.

RBDS—Radio Broadcast Data System is a method of transmitting data simultaneously with a standard GM Stereo (or monophonic) radio used in the United States. The format is slightly different, but substantially compatible with RDS.

RDS—Radio Data System is a method of transmitting data simultaneously with a standard FM stereo (or monophonic) radio developed by the European Broadcasting Union.

TAP—Telocator Alphanumeric Protocol—A standard utilized in the paging industry to electronically send and receive information.

TNPP—Telocator Network Paging Protocol—A data communication standard used between paging terminals to implement a paging network.

What is claimed is:

1. A method of communicating comprising the steps of:

(a) having a sensor provide an output to have an information generator generate a signal;

(b) the information generator formulates information to be delivered to at least two recipients said information generator conducts the information to a data transmitting device;

(c) the data transmitting device receives the information and conducts the information to a processing station;

(d) the processing station receives the information and conducts the information containing an identification code to an FM radio transmitter;

(e) the FM radio transmitter receives the information and transmits the information and said the identification code in a subcarrier of a transmission;

(f) a user of a user-programmable FM radio receiver having entered at least one information code directly into the user-programmable FM radio receiver, said user-programmable FM radio receiver configured to process subcarriers of the transmission for transmitted data; and (g) at least two user-programmable receivers receive and decode the transmission in the subcarrier of the transmission, sort the decoded transmission by comparing the at least one information code which has been programmed by users of the user-programmable receivers and any other programmed information code stored in the user programmable receiver with the identification code of the decoded transmission and only if the at least one programmed information code matches the identification code of the decoded transmission, then decoding a remaining portion of the transmission and utilizing at least a portion of the information provided by the information generator.

2. The method of claim 1 wherein the sensor evaluates a condition; and further comprising the step of:

when the sensor reports a first predetermined condition, sending the signal from the information generator to the data transmission device.

3. The method of claim 2 wherein the information code comprises at least one of an operator code and a PI code.

4. The method of claim 2 wherein the information code comprises a CAPCODE.

5. The method of claim 2 wherein the sensor is a water level sensor.

6. The method of claim 2 wherein the sensor is a fire alarm monitor.

7. The method of claim 6 wherein the fire alarm monitor includes a voice recognition system which compares ambient sound with a stored alarm signal and further comprising the steps of:

(a) comparing the stored alarm signal with the ambient sound in a comparator of the voice recognition system, (b) if the stored alarm signal corresponds with the ambient sound, activating a trigger.

8. The method of claim 7 wherein three trigger signals within a predetermined period of time activates an alarm output to report the first predetermined condition.

9. The method of claim 6 wherein the data transmission device comprises at least a telephone connection and the step of formulating a message further comprises assigning the identification code based on the telephone number corresponding to the telephone of the data transmission device.

10. The method of claim 2 wherein the sensor is a school bus stop reporter having a counter.

11. A method of communicating comprising the steps of:

(a) assigning a plurality of identification numbers with a plurality of physical locations;

(b) programming at least two receivers with a first identification number corresponding to at least one of the plurality of physical locations;

(c) an information generator formulates information to be delivered to at least two recipients, said information generator conducts the information to a data transmitting device;

(c) the data transmitting device receives the information and conducts the information to a processing station;

(d) the processing station receives the information and conducts the information containing an identification code to an FM radio transmitter;

(e) the FM radio transmitter receives the information and transmits the information and said the identification code in a subcarrier of a transmission, said information relevant to at least one of the physical locations and including the associated identification number as a portion of the information transmitted;

(f) a user of a user-programmable FM radio receiver having entered at least one information code directly into the user-programmable FM radio receiver, said user-programmable FM radio receiver configured to process subcarriers of the transmission for transmitted data; and (g) at least two user-programmable receivers receive and decode the transmission in the subcarrier of the transmission, sort the decoded transmission by comparing the at least one information code which has been programmed by users of the user-programmable receivers and any other programmed information code stored in the user programmable receiver with the identification code of the decoded transmission and only if the at least one programmed information code matches the identification code of the decoded transmission, then decoding a remaining portion of the transmission and utilizing at least a portion of the information provided by the information generator.

12. The method of claim 11 wherein at least some of the physical locations correspond to geographic areas.

13. The method of claim 11 wherein at least some of the physical locations correspond to road segments.

14. The method of claim 11 wherein at least a portion of the transmitted information comprises traffic information relating to one of the plurality of physical locations.

15. A method of communicating comprising the steps of:

(a) the information generator formulates information to be delivered to at least two recipients, said information generator conducts the information to a data transmitting device;

(b) the data transmitting device receives the information and conducts the information to a processing station;

(c) the processing station receives the information and conducts the information containing an identification code to an FM radio transmitter, the identification code of the transmission containing at least a portion of a serial number of a particular receiver;

(d) the FM radio transmitter receives the information and transmits the information and said identification code in a subcarrier of a transmission;

(e) a user of a user-programmable FM radio receiver having entered at least one information code directly into the user-programmable FM radio receiver, said user-programmable FM radio receiver configured to process subcarriers of the transmission for transmitted data; and (f) at least two user-programmable receivers receive and decode the transmission in the subcarrier of the transmission, sort the decoded transmission by comparing the at least one information code which has been programmed by users of the user-programmable receivers and any other programmed information code stored in the user programmable receiver with the identification code of the decoded transmission and only if the at least one programmed information code matches the identification code of the decoded transmission, then decoding a remaining portion of the transmission and utilizing at least a portion of the information provided by the information generator, wherein the utilization of at least a portion of the message includes performing a command within the receiver.

16. The method of claim 15 wherein at least one information code is added to the receiver.

17. The method of claim 15 wherein at least one information code is removed from the receiver.

18. The method of claim 16 wherein the at least one information code added is not accessible by the user of the receiver.

19. A method of communicating comprising the steps of:

(a) an information generator formulates information using a monitor to be delivered to at least two recipients, said information generator conducts the information to a data transmitting device; (b) the data transmitting device receives the information and conducts the information to a processing station;

(c) the processing station receives the information and conducts the information containing an identification code to an FM radio transmitter;

(d) the FM radio transmitter receives the information and transmits the information and said the identification code in a subcarrier of a transmission;

(e) a user of a user-programmable FM radio receiver having entered at least one information code directly into the user-programmable FM radio receiver, said user-programmable FM radio receiver configured to process subcarriers of the transmission for transmitted data; and (f) at least two user-programmable receivers receive and decode the transmission in the subcarrier of the transmission, sort the decoded transmission by comparing the at least one information code which has been programmed by users of the user-programmable receivers and any other programmed information code stored in the user programmable receiver with the identification code of the decoded transmission and only if the at least one programmed information code matches the identification code of the decoded transmission, then decoding a remaining portion of the transmission and utilizing at least a portion of the information provided by the information generator.

20. The method of claim 19 wherein the monitor reviews weather information for a particular locality, and when information is provided concerning the particular locality, providing the information to a data transmitter.

21. The method of claim 19 wherein the method further comprises the steps of reviewing an e-mail account with the monitor for new e-mails, and if a new e-mail is present, providing the signal to the data transmitter.

* * * * *